United States Patent
Zech et al.

(10) Patent No.: US 12,179,407 B2
(45) Date of Patent: Dec. 31, 2024

(54) MACHINE BLOCK FOR PRODUCING AND FILLING BOTTLES AND METHOD FOR CONTROLLING THE MACHINE BLOCK

(71) Applicant: KRONES AG, Neutraubling (DE)

(72) Inventors: Thomas Zech, Donaustauf (DE); Sebastian Langwieser, Abensberg (DE)

(73) Assignee: KRONES AG, Neutraubling (DE)

( * ) Notice: Subject to any disclaimer, the term of this patent is extended or adjusted under 35 U.S.C. 154(b) by 172 days.

(21) Appl. No.: 17/998,130

(22) PCT Filed: Mar. 8, 2021

(86) PCT No.: PCT/EP2021/055799
§ 371 (c)(1),
(2) Date: Nov. 7, 2022

(87) PCT Pub. No.: WO2021/223924
PCT Pub. Date: Nov. 11, 2021

(65) Prior Publication Data
US 2023/0226742 A1      Jul. 20, 2023

(30) Foreign Application Priority Data
May 7, 2020   (DE) .................... 10 2020 112 382.5

(51) Int. Cl.
*B29C 49/24*    (2006.01)
*B29C 49/36*    (2006.01)
(Continued)

(52) U.S. Cl.
CPC ........ *B29C 49/42069* (2022.05); *B29C 49/24* (2013.01); *B29C 49/36* (2013.01);
(Continued)

(58) Field of Classification Search
CPC .............. B29C 49/36; B29C 49/42808; B29C 49/42069; B29C 49/4281; B29C 49/24;
(Continued)

(56) References Cited

U.S. PATENT DOCUMENTS 7,678,304 B2 * 3/2010 Zoppas ................... B29C 49/78
264/538
2011/0138594 A1 * 6/2011 Borgatti .................. B29C 49/36
29/401.1
(Continued)

FOREIGN PATENT DOCUMENTS

CN      102292273 A     12/2011
CN      102917956 A      2/2013
(Continued)

OTHER PUBLICATIONS

Mechanical translation of Herrmann et al DE 102016110016 A1. (Year: 2017).*
Mechanical translation of Barre et al (FR 3011943 A1). (Year: 2015).*
ISA European Patent Office, International Search Report Issued in Application No. PCT/EP2021/055799, Jun. 9, 2021, WIPO, 4 pages.

*Primary Examiner* — Robert B Davis
(74) *Attorney, Agent, or Firm* — McCoy Russell LLP (57) ABSTRACT

A method for controlling a machine block comprising a blow-moulding machine for producing bottles and comprising a filler for filling a liquid product into bottles, and a corresponding machine block. Accordingly, the blow-moulding machine comprises an electronic blow-moulding machine controller and an even number of circulating blow-moulding stations, and the filler comprises an electronic filler controller and an even number of circulating filling stations. Since the blow-moulding machine controller specifies a division selection, and the filler controller automatically selects, on the basis of the division selection, one of several filler operating modes all of the machine controllers in the region of the machine block can be instructed in a (Continued)

superordinate manner by the blow-moulding machine controller to automatically adjust the respective operating mode.

17 Claims, 3 Drawing Sheets

(51) Int. Cl.
  *B29C 49/42* (2006.01)
  *B29C 49/78* (2006.01)
  *B67C 3/00* (2006.01)
  *B67C 3/22* (2006.01)

(52) U.S. Cl.
  CPC ........ B29C 49/42808 (2022.05); B67C 3/007 (2013.01); *B29C 2049/2412* (2013.01); *B29C 2049/2458* (2013.01); *B67C 2003/227* (2013.01)

(58) Field of Classification Search
  CPC .... B29C 2049/2412; B29C 2049/2458; B29C 49/28012; B29C 49/0064; B29C 49/78; B29C 2049/7878; B67C 3/007; B67C 2003/226; B67C 2003/227
  See application file for complete search history.

(56) References Cited

U.S. PATENT DOCUMENTS

| | | | | |
|---|---|---|---|---|
| 2011/0236517 A1* | 9/2011 | Senn | ........................ | B29C 49/36 |
| | | | | 425/526 |
| 2011/0287127 A1 | 11/2011 | Dupuis | | |
| 2014/0174034 A1* | 6/2014 | Drenguis | ................ | B29C 49/46 |
| | | | | 53/574 |

FOREIGN PATENT DOCUMENTS

| | | | | |
|---|---|---|---|---|
| CN | 109319237 A | 2/2019 | | |
| CN | 109476068 A | 3/2019 | | |
| DE | 10121833 A1 | 11/2002 | | |
| DE | 102014223696 A1 | 5/2016 | | |
| DE | 102015209367 A1 | 11/2016 | | |
| DE | 102016110016 A1 * | 11/2017 | | |
| DE | 102016221846 A1 | 5/2018 | | |
| DE | 102017120762 A1 | 3/2019 | | |
| FR | 3011943 A1 * | 4/2015 | ......... | G02B 27/0093 |
| WO | 2010084204 A1 | 7/2010 | | |
| WO | 2019048677 A1 | 3/2019 | | |

* cited by examiner

MACHINE BLOCK FOR PRODUCING AND FILLING BOTTLES AND METHOD FOR CONTROLLING THE MACHINE BLOCK

CROSS REFERENCE TO RELATED APPLICATIONS

The present application is a U.S. National Phase of International Application No. PCT/EP2021/055799 entitled "MACHINE BLOCK FOR PRODUCING AND FILLING BOTTLES, AND METHOD FOR CONTROLLING THE MACHINE BLOCK," and filed on Mar. 8, 2021. International Application No. PCT/EP2021/055799 claims priority to German Patent Application No. 10 2020 112 382.5 filed on May 7, 2020. The entire contents of each of the above-listed applications are hereby incorporated by reference for all purposes.

TECHNICAL FIELD

The invention relates to a method for controlling a machine block with a blow molding machine for producing bottles and to a filler for filling a liquid product into bottles.

BACKGROUND AND SUMMARY

Machine blocks for producing and filling bottles typically comprise a blow molding machine, a labeler, and a filler for producing, labeling, and filling the bottles with a liquid product, in particular a beverage. They are rotary machines in which treatment stations or holders for the containers revolve continuously with an evenly spaced division. Such machine blocks are basically designed such that one container can be produced for each division of the blow molding machine and one bottle can be labeled and filled with the product at each division of the labeler and the filler. These machines are firmly coupled to each other in terms of transport technology by way of transfer starwheels, such as pitch reduction starwheels, so that ideally each division in the transport path is always occupied by one bottle.

Nevertheless, production circumstances can arise in which not all divisions at the respective treatment machines are occupied by a bottle. For example, only every second division can be used at the blow molding machine for producing a bottle, i.e. either the revolving blowing stations with an uneven division number or the blowing stations with an even division number. There are several possible reasons for this. For example, the blow molding machine can be equipped with a blowing station only at every second division for reasons of costs, for example, when the capacity of the blow molding machine is not fully utilized. Likewise, the blowing stations with an uneven division number can be configured for a different container format than the blowing stations with an even division number. Different container formats can then be produced with little conversion effort, namely by alternating the use of uneven and even divisions.

If only every second division of the blow molding machine is used, then the associated preforms are only made available at every second division. Special clocking wheels are known for this purpose which, depending on the synchronization setting, feed preforms only to the blowing stations with an uneven division number or those with an even division number.

Furthermore, it can happen in the case of a labeler with two labeling units, that labelling is performed only with the available labeling unit due to a defect or other deactivation of one of the labeling units. In this case, the machine output of the labeler and the machine block is reduced overall. Only every second division is then filled at the labeler with a previously produced container, which is known to be possible, for example, with the help of a special in-feed auger.

Furthermore, it can happen that filling large-volume bottles requires more time or space than is available per revolution of the filler in the above-mentioned ideal operation of the machine block. In this case, only every second division of the filler can be occupied with a bottle, i.e. again only the filling stations with an uneven division number or the filling stations with an even division number. This is possible, for example, with a pitch reduction starwheel. When the bottles are then capped, it is ensured that a closure cap or the like is only clocked in at every second division. Special clocking wheels for the closures are also known for this as well. Furthermore, the division of the filler may also be too small for certain containers. This happens when a filling carousel is present in production with a certain specified division for a container diameter, but the container that is actually being produced in production does not have the diameter that would be necessary for the division of the filling carousel.

However, it has proven to be problematic that the above-mentioned reasons for the use of only uneven division numbers or even division numbers as well as the decommissioning of individual labeling units can also occur together. In addition, despite their integrated design, the machines at issue have to be set individually to a suitable production mode by manually activating at in the respective control device. This is cumbersome and also entails the risk of operating errors.

There is therefore a need for control methods that are improved in this respect and for correspondingly improved machine blocks for producing and filling bottles.

The method is used for controlling a machine block with a blow molding machine for producing bottles and a filler for filling a liquid product into bottles as well as a corresponding machine block. According thereto, the blow molding machine comprises an electronic blow molding machine control device and an even number of revolving blowing stations, the filler accordingly comprises an electronic filler control device and an even number of revolving filling stations.

According to the invention, the blow molding machine control device specifies a division selection that determines whether the bottles are produced in all blowing stations or only in those with an uneven division number or only in those with an even division number. The filler control device then selects in an automated manner based on the division selection transmitted thereto one of several filler modes of operation, which differ in terms of the selective loading of the filling stations with uneven and/or even division numbers and/or in terms of whether the relative transport speed of the bottles at the filler is halved in relation to the blow molding machine.

The blow molding machine control device manages the modes of operation of the individual production machines possible and selected in the machine block and, based thereupon, makes the division selection in the sense of superordinate production control. The specification of the division selection enables the automated adjustment of the modes of operation in the other production machines, namely at least in the filler control device, but also in a labeling control device and/or a capper control device.

This reduces the number of inputs required at the individual machine control devices of the machine block and the risk of incorrect operation.

The blow molding machine control device preferably generates division selection data indicating the division selection and sends the division selection data to the filler control device for the selection of the filler mode of operation there, in particular via an interposed labeling control device.

The division selection data enables uniform transmission of the division selection specified in the blow molding machine control device to a number of subordinate production control devices. This pertains, for example, to the synchronized clocking of preforms at the blow molding machine itself and the synchronized clocking of caps at the capper, as well as the selection of suitable modes of operation at a labeler arranged downstream and at the filler.

The division selection data can be transmitted in a simple manner, for example, as an analog signal level. For example, three appropriately stepped signal levels are used to identify the division selection "all divisions", "uneven divisions only", or "even divisions only".

A labeling control device interposed between the blow molding machine control device and the filler control device preferably makes a unit selection that defines the labeling of the bottles at two labeling units connected in series, labeling only at one labeling unit or labeling only at the other labeling unit.

This enables flexible and efficient production operation with a labeler comprising two labeling units.

The labeling control device preferably selects in an automated manner and based on the division selection and the unit selection one of several labeling modes of operation in which the bottles are labeled either with only one labeling unit at uneven or even division numbers, only with the other labeling unit at uneven or even division numbers, or with both labeling units at all division numbers.

It is then possible to continue production despite the shutdown of an individual labeling unit. The appropriate division assignment at the labeling unit then takes place in an automated manner based on the division selection data transmitted.

Since the labeling units are arranged in a stationary manner in the periphery of revolving holders for the containers, such as turntables and centering bells, the selected division numbers at the labeler relate to the respective holders/transport positions for the containers.

The labeling control device preferably generates unit selection data indicating the unit selection and sends it to the filler control device for the selection of the filler mode of operation there and/or to the blow molding machine control device for the division selection there.

The unit selection data enables the uniform transmission of the unit selection specified in the labeling control device also to the superordinate production control device at the blow molding machine. This pertains, for example, to the synchronized clocking of preforms at the blow molding machine itself and the synchronized clocking of caps at the capper, as well as the selection of suitable modes of operation at the labeler.

The labeling control device preferably sends unit selection data relating to the use of the first and/or second labeling unit to the filler control device and, in particular, also forwards the division selection data of the blow molding machine control device to the filler control device. This allows the downstream filler to be controlled according to a filler mode of operation adapted to the division selection and the unit selection in an automated manner.

The filler control device preferably selects the respective filler mode of operation as a function of the division selection data and/or unit selection data received. The filler can therefore be adapted in an automated manner to the production conditions prevailing upstream. Operating errors and/or faulty production are then reliably avoided in the region of the filler.

The division selection is preferably specified as a function of whether a first or second labeling unit present/provided at the labeler is out of operation. For example, one of the labeling units can be temporarily out of operation due to a defect or to the supply of operating materials. In this case, at least the preforms preheated at the blow molding machine could still be processed and the bottles produced from them be properly labeled and filled downstream.

However, it is also conceivable to adapt the labeling to a container format to be processed by selecting a unit.

The labeler could detect in an automated manner whether operational labeling units are connected to the docking stations. It can also be specified manually at the labeling control device whether a specific labeling unit is out of operation or should not be used. Such status of operation can be transmitted in an automated manner to the blow molding machine control device and taken into account for division selection there.

In addition or as an alternative, the division selection can be format-dependent/blowing-specific, depending on whether only the blowing stations with an uneven division number or the blowing stations with an even division number are suitable for producing the bottles. For example, the divisions of the blow molding machine can be equipped alternately with blowing stations for the production of different bottle formats. In principle, however, it is also conceivable that every second division of the blow molding machine is temporarily or permanently not occupied by a blowing station.

In addition or as an alternative, the division selection can be specified as a function of whether the filling respectively requires in a filling-specific and/or blowing-specific manner that the relative transport speed of the filler be halved (halving of the rotational speed) with respect to the blow molding machine and/or requires twice the revolutions of the bottles at the filler, where the filling stations are loaded alternatingly with uneven or even division numbers.

This can be necessary, for example, when filling large bottles requires more time than is ideally possible with fully occupied divisions and nominal rotation speed/uniform transport speed.

For example, different modes of operation can be selected manually at the filler. The filler mode of operation selected is then transmitted to the blow molding machine control device which makes a suitable division selection, based on which all further clocking, synchronization, and division occupation with bottles are adjusted at the treatment machines in the machine block in an automated manner.

The filler is preferably associated with a capper with a capper control device and an even number of revolving capping stations for capping the containers, where the capper control device selects in an automated manner one of several capper modes of operation as a function of the filler mode of operation, which differ in terms of whether all capping stations, only the capping stations with an uneven division number, or only the capping stations with an even division number are loaded with closure caps.

The capper control device can either be subordinate to the filler control device or, a separate machine control device that receives the information required for selecting the appropriate capper mode of operation directly from the superordinate blow molding machine control device, in particular in the form of the division selection data. Reliable operation of the capper is then given when using different divisions in the machine block.

A labeling mode for the optional operation of a first and/or second labeling unit, a filler mode of operation for relative halving of the rotational speed (halving of the transport speed) or for the selection of all existing filling stations or only those with an even or uneven division number, and/or a capping mode for the selection of all available capping stations or only those with an uneven or even division number are preferably selected in an automated manner, respectively based on a superordinate division selection in the blow molding machine control device and by way of a downstream labeling control device/filler control device/capper control device.

This is to mean that information about the respective producing requirements for the blow molding machine, for the labeler, and for the filler converges centrally in the blow molding machine and a suitable selection of the divisions to be used at the blow molding machine is initially made there. The other machine control devices of the machine block gear toward this selection which is sent either directly to the respective machine control device or indirectly via an interposed machine control device. For example, the labeling control device can supplement or modify the information regarding the predetermined division selection received from the blow molding machine, in particular with information about a unit selection in the labeler, and then send it onward to the filler control device.

This means that straightforward production control of the machine block is given, also for a plurality of different production requirements in the individual treatment machines. In other words, with the division selection at the blow molding machine, a starting point for production control of the entire machine block is generated centrally and sent to the individual treatment machines for their decentralized machine control. Production control at the machine block can also be changed in a so-called "on the fly" mode. The on-the-fly mode means that the machine block finishes producing a production batch under certain production requirements, while a new production batch begins at the blow molding machine's clocking wheel having different production requirements than the last production batch to run out. This makes it possible to change over the machine block to a different production requirement on the fly, without having to stop the machine block.

The machine block therefore comprises: a blow molding machine for producing bottles with an associated blow molding machine control device; a labeler for labeling the bottles with an associated labeling control device; a filler for filling the bottles with a liquid product with an associated filler control device; and a capper for capping the bottles with an associated capper control device.

According to the invention, the blow molding machine control device and the filler control device and in particular also the labeling control device and the capper control device are programmed and connected to one another for data exchange such that the method according to at least one of the embodiments described above can be carried out with them. The advantages described with regard to the method can thus be obtained.

The blow molding machine control device is preferably configured as a superordinate production control device of the machine block, firstly, for selecting the blowing stations/divisions to be used for bottle production and, secondly, for outputting associated division selection data at least to the filler control device. Based on this, the filler can be controlled decentrally by the filler control device. Other treatment machines present in the machine block can likewise be controlled in a decentralized manner based on the division selection data. This means that the machine control device of the machine block can have a proven modular structure and can still be centrally adapted to different production requirements.

The blow molding machine control device, the labeling control device, the filler control device, and the capper control device are to be understood to be decentralized/independent machine control devices, the blow molding machine control device additionally to be a superordinate production control device of the machine block, to which the other machine control devices are subordinate in this regard.

The labeler preferably comprises two labeling units that can be switched on separately from one another, and/or the labeling control device is configured to specify optional labeling of the bottles at the uneven or even or all division numbers of the labeler. This enables a flexible production process in the machine block even when a labeling unit is shut down during production, in particular to process all the preforms made available to the blow molding machine and bottles produced therefrom by proper labelling, filling, and capping.

The filler control device is preferably configured to trigger, as a function of the division selection data from the blow molding machine control device, halving the relative rotational speed (halving the transport speed) of the filler and filling of the bottles at all filling stations.

This means that the bottles upstream of the filler are processed at normal/single transport speed, but are processed only at every second division and are therefore fed to the filler having twice the transport spacing.

When the rotational speed of the filler is halved, each filling station can then be loaded with a bottle and filled over a correspondingly longer revolution time due to the division reduction at the infeed.

The filler control device is preferably furthermore configured to trigger, as a function of the division selection data from the blow molding machine control device, filling the bottles over two filler revolutions alternately at filling stations with uneven or even division numbers.

This means that two revolutions are then available at the filler for filling the bottles and either the filling stations with an uneven division number or the filling stations with an even division number are loaded with a bottle alternately for two revolutions.

BRIEF DESCRIPTION OF THE FIGURES

Preferred embodiments of the invention shall be illustrated by way of drawings: where.

DETAILED DESCRIPTION

Figure 1:
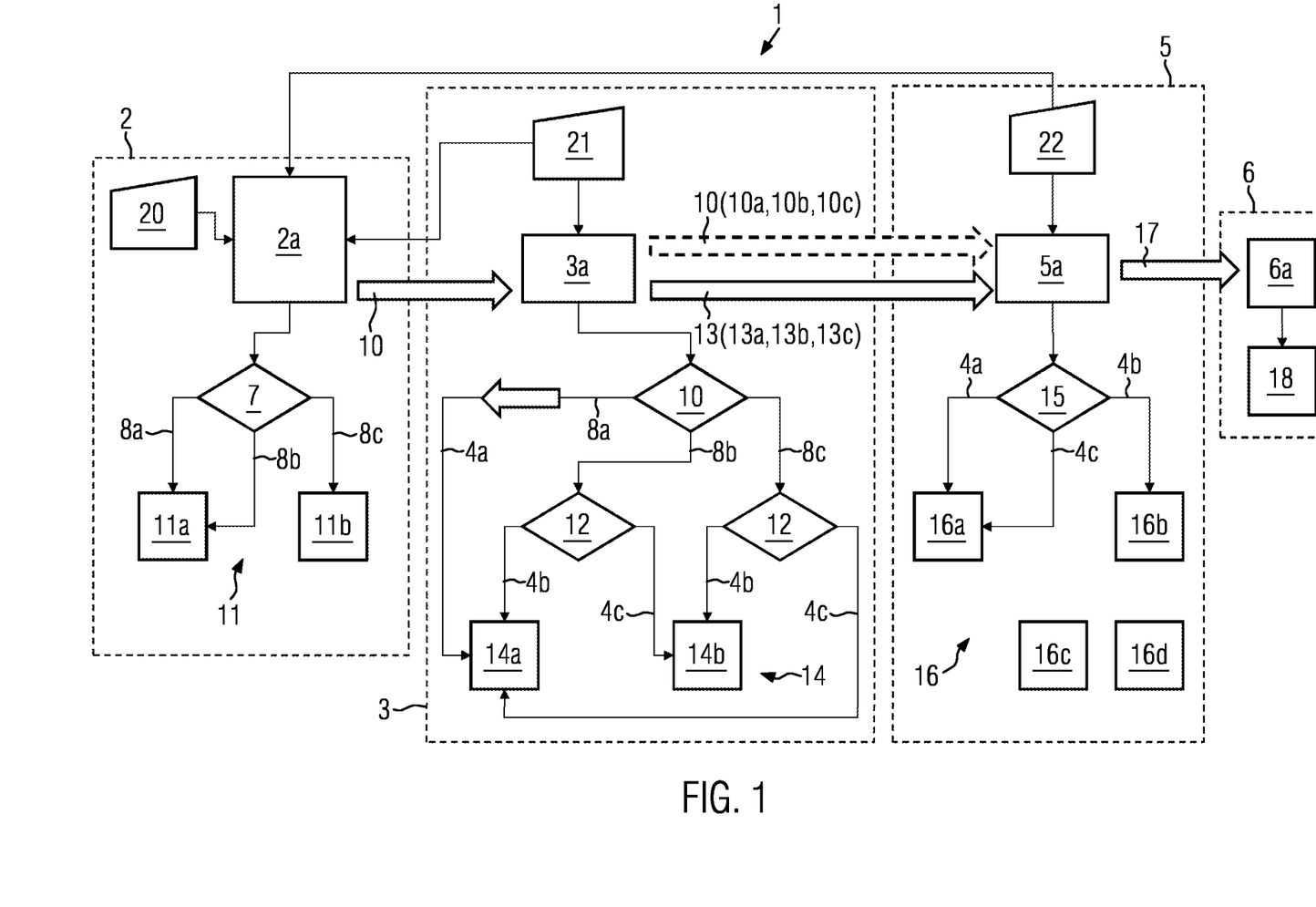
FIG. 1 shows a schematic sequence of the method of a first embodiment.
Figure 3:
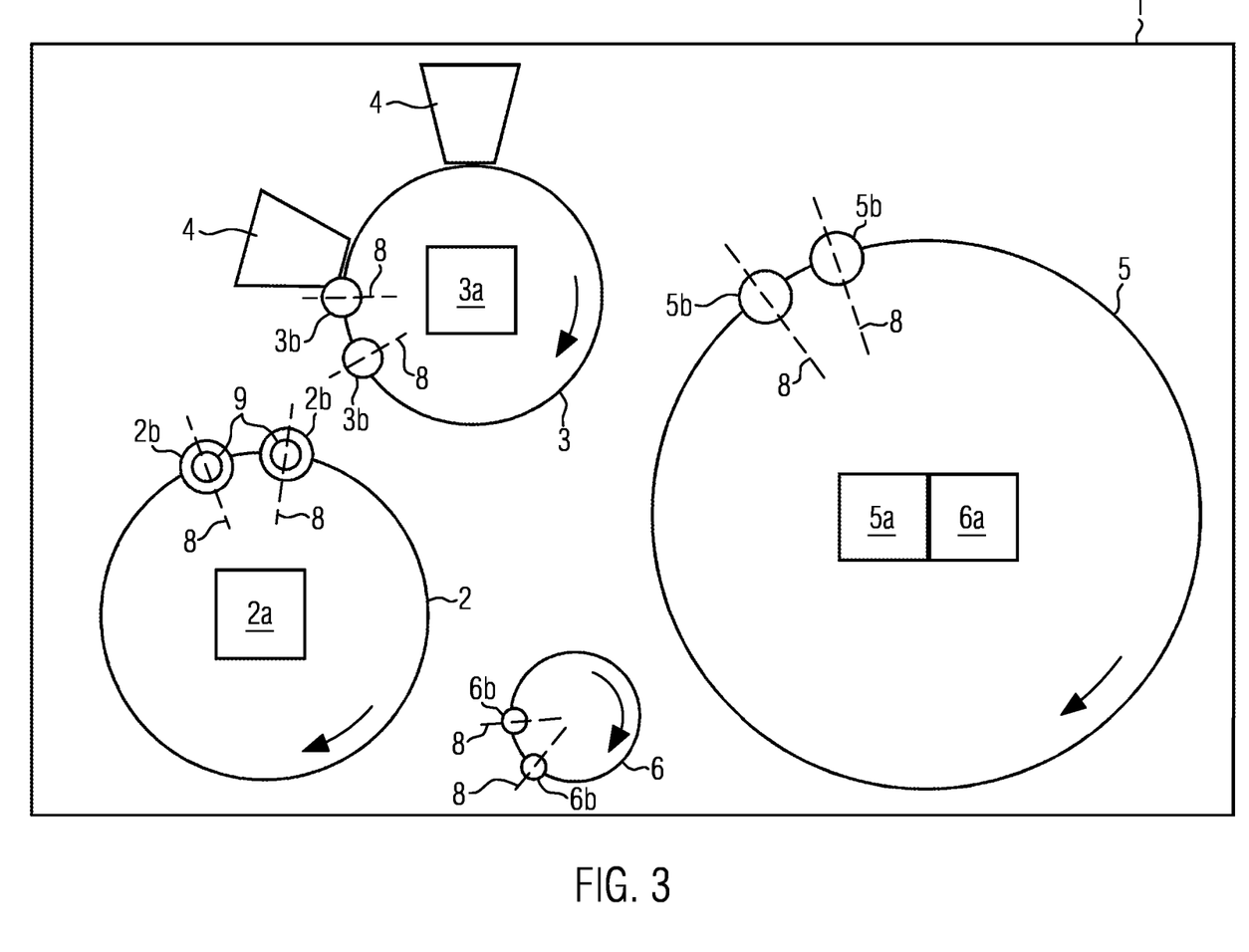
FIG. 3. shows a schematic representation of the machine block.

As shown by FIGS. 1 and 3 in synopsis, the method described is used for the central production control of a machine block 1 with rotary machines for filling bottles.

Machine block 1 comprises: a blow molding machine 2 with a blow molding machine control device 2a and an even number of revolving blowing stations 2b (only two of which are shown); a labeler 3 with a labeling control device 3a and an even number of revolving bottle holders 3b (only of which are shown) and with at least one stationary labeling unit 4, preferably with two stationary labeling units 4; a filler 5 with a filler control device 5a and an even number of revolving filling stations 5b (only two of which are shown); and a capper 6 with a capper control device 6a and an even number of revolving capping stations 6b (only two of which are shown).

The control devices mentioned above are preferably configured for decentralized and independent control of the respective production machine. However, capper control device 6a could also be integrated, for example, into filler control device 5a.

Blow molding machine control device 2a also operates as the central production control device of machine block 1, to which labeling control device 3a, filler control device 5a, and capper control device 6a are subordinate with regard to production management in machine block 1.

Figure 2:
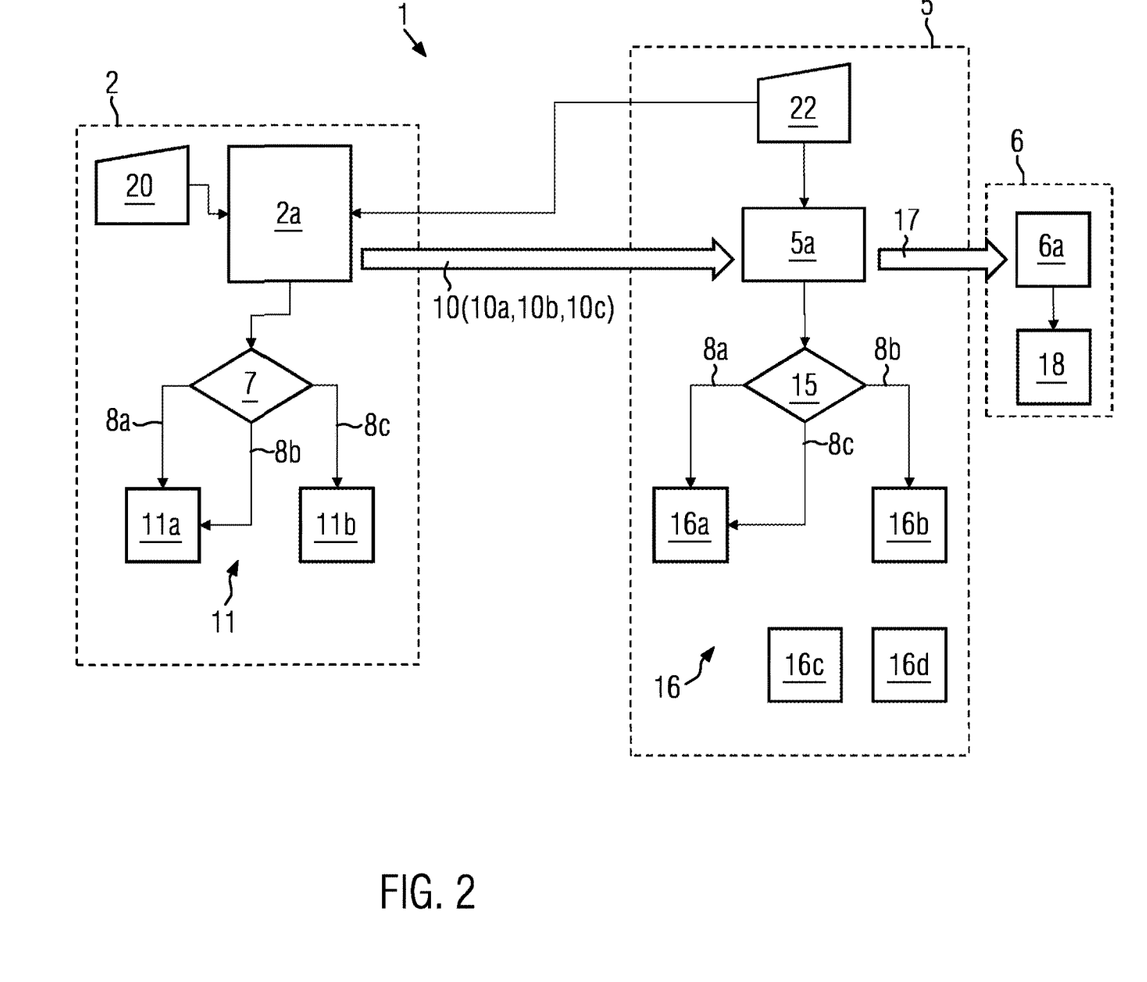
FIG. 2. shows a schematic sequence of the method of a second embodiment.

As is indicated schematically in FIG. 2, blow molding machine control device 2a makes a division selection 7 for this purpose and thereby determines at which divisions 8 of blow molding machine 2 bottles 9 are to be produced. Loading divisions 8 with all division numbers 8a (with uneven and even division numbers), with uneven division numbers 8b exclusively, or with even division numbers 8c exclusively can be selected.

According to the selected division numbers 8a (all), 8b (only uneven) or 8c (only even), the associated blowing stations 2b are selectively occupied with preforms (not shown) during production in order to blow bottles 9 therefrom and to transport them accordingly to uneven and/or even division numbers 8a, 8b, 8c downstream.

Blow molding machine control device 2a furthermore generates division selection data 10 corresponding to respective division selection 7. Division selection data 10 can be generated, for example, as analog signals in the form of suitably stepped signal levels 10a, 10b, 10c which then indicate division selection 7 of all division numbers 8a, exclusive division selection 7 of uneven division numbers 8b, or exclusive division selection 7 of even division numbers 8c.

Based on which division selection 7 has been made, blow molding machine control device 2a furthermore selects one of several modes of operation 11 of blow molding machine 2. Modes of operation 11 define internal control parameters for the local/decentralized control of blow molding machine 2 for the respectively selected production operation. A first mode of operation 11a and a second mode of operation 11b, which are activated in an automated manner as a function of division selection 7, are shown by way of example.

Division selection data 10 is transmitted to labeling control device 3a in a suitable electronic manner, for example, by wire or wirelessly. Labeling control device 3a therefore receives information about division selection 7 made, i.e. at which division numbers 8a (all), 8b (only uneven) or 8c (only even) bottles 9 are transported in and taken over by bottle holders 3b of labeler 3.

Labeling control device 3a also has information about whether one of labeling units 4 is possibly not ready for use. For example, one of labeling units 4 can be temporarily out of operation or not present due to a defect or due to the necessary supply of operating materials.

Labeling control device 3a receives information about such machine status of labeling unit 3 by manual input or by sensors in labeler 3, for example, whether a docking position (not shown) for a labeling unit 4 is unoccupied.

Labeling control device 3a makes a unit selection 12 for the production operation on this basis, namely whether a labeling unit 4 should be excluded from labeling bottles 9 or not. There are preferably three labeling modes to select from, namely: labeling 4a at two labeling units 4; labeling 4b only at a first labeling unit 4; or labeling 4c only at a second labeling unit 4.

For this purpose, labeling control device 3a generates unit selection data 13 corresponding to respective unit selection 12. Unit selection data 13 can again be generated as analog signals in the form of suitably stepped signal levels 13a, 13b, 13c or the like, which then indicate unit selection 12 made in the above sense.

Different modes of operation 14 of labeler 3 are associated with possible combinations of division selection 7 received and unit selection 12 defined, in FIG. 1 for example, a first mode of operation 14a and a second mode of operation 14b.

Modes of operation 14 determine internal control parameters for the local/decentralized control of labeler 3 for its respective production operation.

Division selection data 10 and/or unit selection data 13 are transmitted to filler control device 5a in a suitable electronic manner, for example, by wire or wirelessly. Division selection data 10 can be forwarded unchanged or also modified by labeling control device 3a. Division selection data 10 can also be sent directly from blow molding machine control device 2a to filler control device 5a.

Filler control device 5a therefore receives information about whether labeled bottles 9 are labeled at all division numbers 8a, only on uneven division numbers 8b, or only on even division numbers 8c, and possibly also which labeling unit 4 is used for this.

Unit selection data 13 can be sent by itself or in combination with division selection data 10 to filler control device 5a for the assignment 15 there of one of several filler modes of operation 16 of filler 4.

Filler modes of operation 16 define internal control parameters for the local/decentralized control of filler 5 for its respective production operation.

Respectively suitable filler mode of operation 16 is selected/assigned by filler control device 5a in an automated manner based on unit selection data 13 and/or division selection data 10. This is only shown by way of example in FIG. 1 for unit selection data 13 (labeling 4a, 4b or 4c), in FIG. 2 for division selection data 10 (division numbers 8a, 8b or 8c).

Filler modes of operation 16 can comprise, for example, a first mode of operation 16a in which all filling stations 5b are loaded, or in which even division numbers 8c are loaded exclusively. Filler 5 then preferably runs at the same transport speed as blow molding machine 2.

Filler modes of operation 16 then preferably comprise a second mode of operation 16b with exclusive loading of uneven division numbers 8b. Filler 5 then preferably likewise runs at the same transport speed as blow molding machine 2.

A third mode of operation 16c is also conceivable in which the rotational speed of filler 5 is halved so that its transport speed is only half that of blow molding machine 2. Only every second division number is then to be filled with a bottle 9 upstream of filler 5, either uneven or even ones.

A fourth mode of operation 16d of filler 5 is also conceivable in which it operates at the same transport speed as blow molding machine 2, but with every second revolution of filler 5 changes over between loading only uneven division numbers 8b and loading only even division numbers 8c. Each bottle 9 then revolves twice at filler 5. Whether the fourth mode of operation 16d is possible depends, for example, on the configuration of filler 5, in particular the control functions of individual filling stations 5b.

Capper control device 6a receives information 17 from filler control device 5a for the automated selection of one of several capper modes of operation 18 in order to clock closure caps (not shown) to match the filler mode of operation 16 specified by filler control device 5a and to provide them to capping stations 6b occupied by bottles 9.

Capper modes of operation 18 define internal control parameters for the local/decentralized control of capper 6 for its respective production operation.

Such indirect machine control of capper 6 is ultimately based on division selection 7 in blow molding machine control device 2a, i.e. in superordinate production control at blow molding machine 2.

Division selection 7 in blow molding machine control device 2a can take place based on different production requirements and/or machine status in at least one of the treatment machines of machine block 1.

A blow molding-specific type selection 20 in the region of blow molding machine 2 for the manufacture of a certain bottle format is shown by way of example, associated with which could be, for example, only blowing stations 2b with uneven division numbers 8b or only blowing stations 2b with even division numbers 8c, possibly also blowing stations 2b of all division numbers 8a.

This means that if a bottle format according to a blow molding-specific type selection 20 can only be produced in blowing stations 2b with uneven division numbers 8b, then blow molding machine control device 3 makes a corresponding division selection 7 and sends corresponding division selection data 10 to the machine control devices of machine block 1 that are subordinate with regard to production management.

Furthermore, defined machine status 21 of labeler 3 can enter into division selection 7. For example, imminent or completed decommissioning of a specific labeling unit 4 can be entered at labeling control device 3a or also be detected in an automated manner. This means that unit selection 12 can be triggered manually or in an automated manner depending on machine status 21. Machine status 21 is then transmitted in an automated manner to blow molding machine control device 2a for matching division selection 7.

If, for example, even or uneven division numbers were fixedly assigned to a selected labeling unit 4, blow molding machine control device 2a could make a suitable division selection 7 based on existing machine status 21 and generate corresponding division selection data 10 for subsequent central production control of the machine control devices of machine block 1 that are subordinate in this regard, as has already been described above.

There may also be a need for longer filling processes or larger bottle diameters, for example, for filling certain products into certain bottle formats, and a filling-specific type selection 22 can be made manually at filler 5, for example, at input device of filler control device 5a.

It can then be necessary, for example, for only every second division to be used for production upstream of filler 5, i.e. for example, only blowing stations 2b with an uneven division number 8b and/or only a specific labeling unit 4.

Filling-specific type selection 22 in the region of filler 5 is then transmitted in an automated manner to blow molding machine control device 2a that is superordinate with regard to production management in machine block 1, in order to make a suitable division selection 7 there to generate the corresponding division selection data 10, and to then transmit it to the machine control devices of machine block 1 that are subordinate in this regard.

Production control at machine block 1 can also be operated in a so-called "on the fly" mode. The "on the fly" mode means that machine block 1 finishes producing a production batch under certain production requirements, i.e. fills the last bottles in filler 5 and then delivers them to capper 6 for capping, while a new production batch begins at infeed starwheel of blow molding machine 2, namely with different production requirements that differ from the last production batch to run out. This makes it possible to perform a change-over at machine block 1 to a different production requirement on the fly, without having to stop machine block 1.

FIG. 2 shows a simplified embodiment of the method which differs from the embodiment shown in FIG. 1 substantially only in that no unit selection 12 (in the sense of a selective deselection of a labeling unit 4) is possible and division selection 7 in blow molding machine control device 2a can be made independently of machine status 21 of labeler 3. A labeler 3 that is nevertheless present in machine block 1 is therefore not shown for the sake of simplicity.

The simplified embodiment applies, for example, when labeler 3 comprises only a single labeling unit 4 and the modes of operation 16 of filler 5 are independent of labeler 3. The simplified configuration can also be applicable in a machine block solution which consists of a blow molding machine 1 and a filler 5 with a subsequent capper 6. Labeler 3 would then be connected downstream of the machine block.

Accordingly, division selection data 10 can then be transmitted directly from blow molding machine control device 2a to filler control device 5a. Nevertheless, labeler 3 (not shown in FIG. 2) can receive division selection data 10 from blow molding machine control device 2a for superordinate production control in order to prevent, for example, labels being dispensed to bottle holders 3b not occupied by bottles 9.

In the simplified embodiment of the method as well, division selection 7 takes place on the basis of blowing-specific type selection 20 in the region of blow molding machine 2 and/or filling-specific type selection 22 in the region of filler 5, each after corresponding data transmission to blow molding machine control device 2a.

In addition to type selection 20, 22 and/or machine status 21 described, other status data, monitoring results from sensors or the like from the region of machine block 1 can also enter into superordinate division selection 7 in blow molding machine control device 2a.

FIG. 3 shows a typical system configuration of machine block 1 comprising blow molding machine 2, labeler 3 with two labeling units 4, filler 5, and capper 6. Not shown are known transfer starwheels, pitch reduction starwheels or the like for transporting bottles 9 through machine block 1.

Two divisions 8 with blowing stations 2b are indicated schematically at blow molding machine 2, two divisions 8 with bottle holders 3b at labeler 3, two divisions 8 with filling stations 5b at filler 5, and two divisions 8 with capping stations 6b at the capper.

Blow molding machine control device 2a, labeling control device 3a, and filler control device 5a could each have separate input devices (not shown), for example, for decentralized type selection 20, 22 and determination of machine status 21. In principle, such inputs would also be possible centrally.

With the method described and machine block 1 described, different production requirements and machine status can be processed in an automated manner at blow molding machine 2, at labeler 3, as well as at filler 5 in blow molding machine control device 2a and using division selection data 10 generated there for the automated adapted control of labeler 3, filler 5 and capper 6, which can also be controlled separately as an option.

In addition, emergency operation of labeler 3 can be initiated with the exclusion of a labeling unit 4 that has been taken out of service, in particular for emptying machine block 1, and, starting out from superordinate blow molding machine control device 1, can be taken into account in all subordinate machine control devices of machine block 1.

The invention claimed is:

1. Method for controlling a machine block with a blow molding machine for producing bottles and a filler for filling a liquid product into said bottles, where said blow molding machine comprises an electronic blow molding machine control device and an even number of revolving blowing stations, and said filler comprises an electronic filler control device and an even number of revolving filling stations, where said blow molding machine control device specifies a division selection that determines whether said bottles are produced in all blowing stations or only in those with an uneven division number or only in those with an even division number, and where said filler control device selects in an automated manner and based on said division selection one of several filler modes of operation which differ with regard to a loading of said filling stations with an uneven and/or even division number and/or whether a relative transport speed of said filler is halved with regard to said blow molding machine.

2. Method according to claim 1, where said blow molding machine control device generates division selection data indicating said division selection and sends it to said filler control device for the selection of said filler mode of operation there.

3. Method according to claim 1, where a labeling control device interposed between said blow molding machine control device and said filler control device makes a unit selection that defines labeling of said bottles at two labeling units connected in series, labeling only at one labeling unit, or labeling only at said other labeling unit.

4. Method according to claim 3, where said labeling control device selects in an automated manner and based on said division selection and said unit selection one of several labeling modes of operation in which said bottles are labeled either with only one labeling unit at uneven or even division numbers, only with said other labeling unit at uneven or even division numbers, or with both labeling units at all division numbers.

5. Method according to claim 3, where said division selection is specified as a function of whether one of said labeling units is out of operation.

6. Method according to claim 3, where said labeling control device generates said unit selection data indicating said unit selection and sends it to said filler control device for the selection of said filler mode of operation there and/or to said blow molding machine control device for said division selection there.

7. Method according to claim 2, where said filler control device selects said filler mode of operation as a function of said division selection data and unit selection data received.

8. Method according to claim 1, where said division selection is specified in a blowing-specific manner, depending on whether said blowing stations with uneven or even division numbers exclusively are suitable for producing said bottles.

9. Method according to claim 1, where said division selection is specified as a function of whether said filling respectively requires in a filling-specific and/or blowing-specific manner that the relative transport speed of said filler be halved with regard to said blow molding machine and/or requires twice the revolutions of said bottles at said filler, where said filling stations are loaded alternatingly with uneven or even division numbers.

10. Method according to claim 1, where said filler is associated with a capper with a capper control device and an even number of revolving capping stations for capping said bottles, and where said capper control device selects in an automated manner as a function of said filler mode of operation one of several capper modes of operation which differ in terms of whether all capping stations, only capping stations with an uneven division number, or only capping stations with an even division number are loaded with closure caps.

11. Machine block comprising: a blow molding machine for producing bottles with an associated blow molding machine control device; a labeler for labeling said bottles with an associated labeling control device; a filler for filling said bottles with a liquid product with an associated filler control device; and a capper for capping said bottles with an associated capper control device, wherein said blow molding machine control device and said filler control device are programmed and connected to one another for data exchange such that said blow molding machine control device and said filler control device are configured to carry out the method according to claim 1.

12. Machine block according to claim 11, where said blow molding machine control device is configured as a superordinate production control device for selecting said blowing stations to be used for producing said bottles and for a downstream output of associated division selection data, and where said labeling control device, said filler control device, and said capper control device are configured as subordinate production control devices for excluding said division numbers that are respectively not to be loaded with bottles/closure caps based on said division selection data.

13. Machine block according to claim 11, where said labeler comprises two labeling units that can be switched on separately from one another, and/or said labeling control device is configured to specify optional labeling of said bottles at said uneven or even or all division numbers of said labeler.

14. Machine block according to claim 11, where said filler control device is configured to trigger, as a function of said division selection data of said blow molding machine control device, relative halving of a rotational speed/transport speed of said filler and filling said bottles at all filling stations.

15. Machine block according to claim 11, where said filler control device is configured to trigger, as a function of said division selection data from said blow molding machine control device, the filling of said bottles over two filler revolutions alternately at filling stations with uneven or even division numbers.

16. Method of claim 2, where said division selection data is sent to an interposed labeling control device.

17. Machine block of claim 11, where said labeling control device and said capper control device are also programmed and connected for said data exchange.

* * * * *